United States Patent Office 3,443,783
Patented May 13, 1969

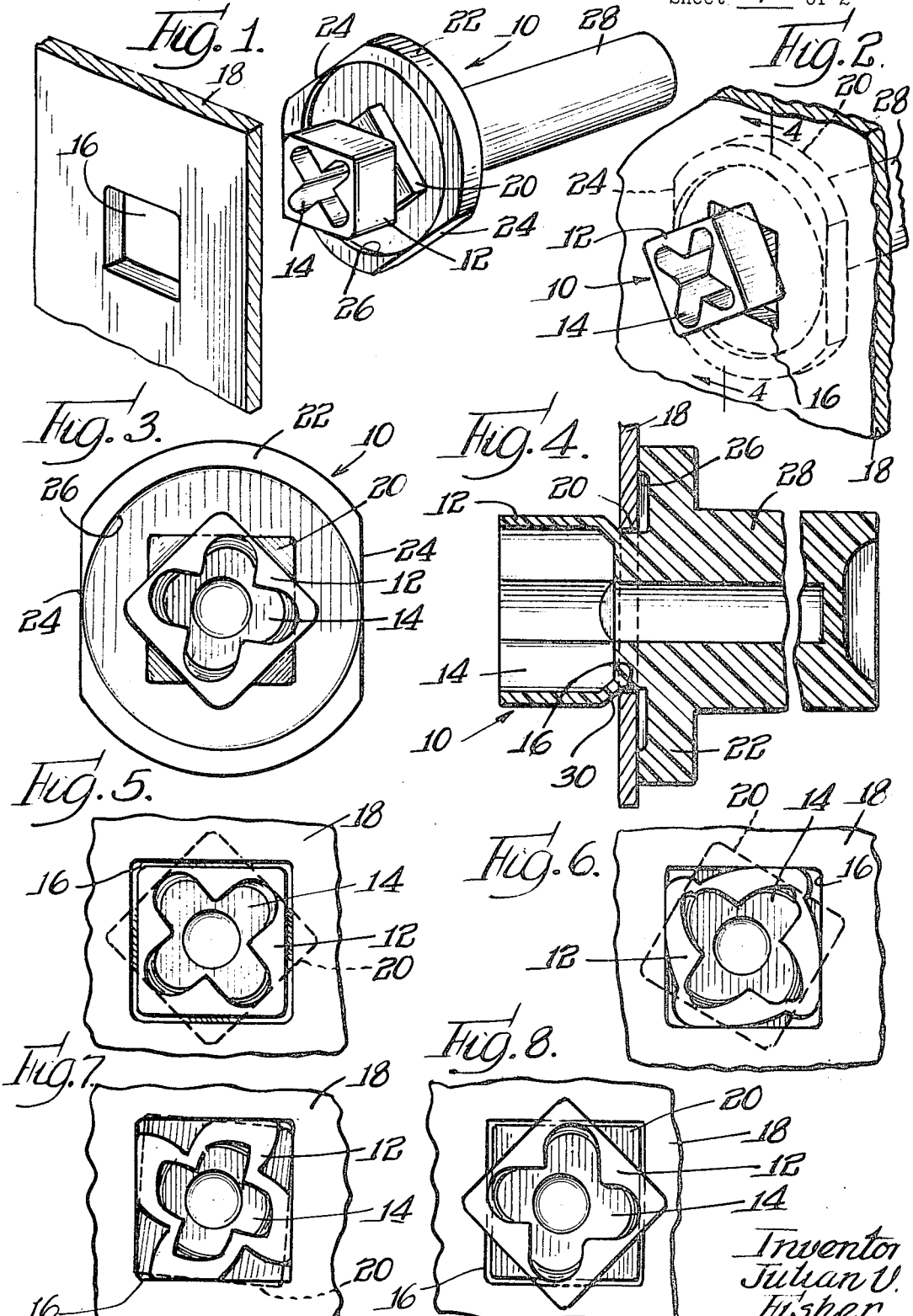

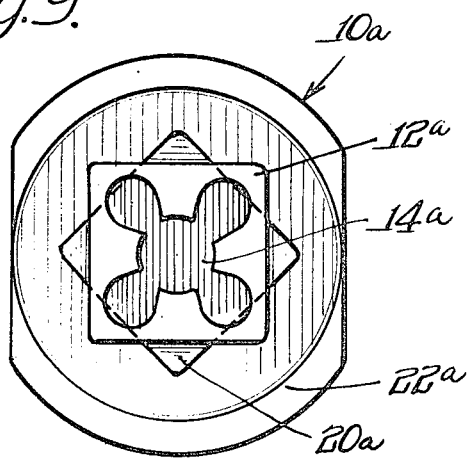
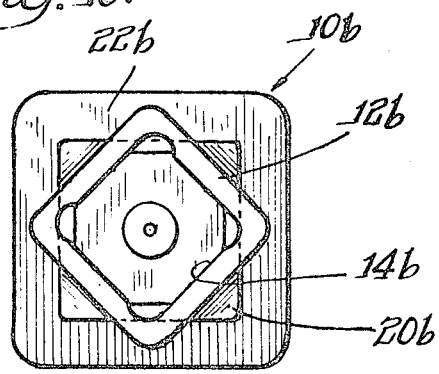
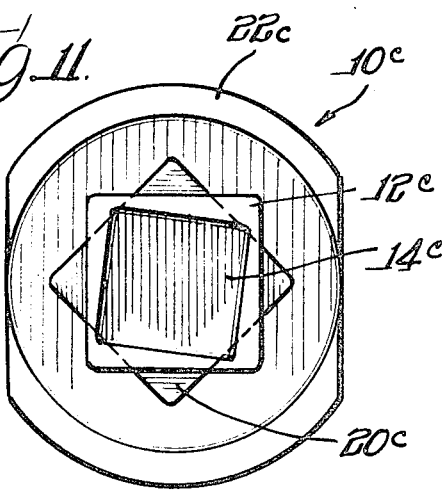
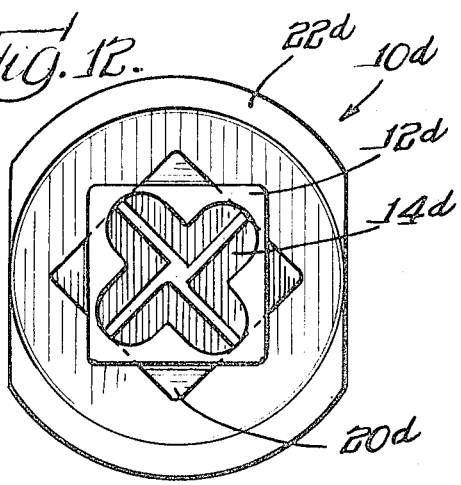
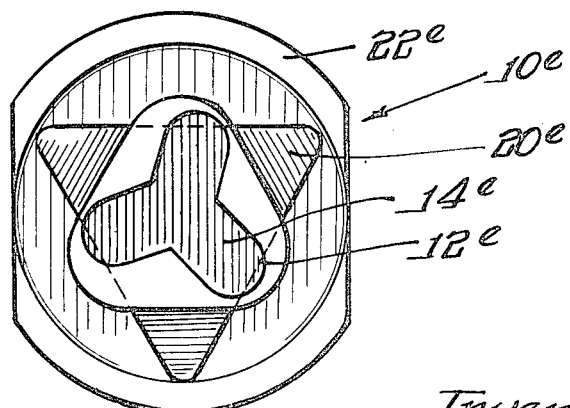

3,443,783
PLASTIC FASTENER
Julian V. Fisher, Carpentersville, Ill., assignor to Illinois Tool Works Inc., Chicago, Ill., a corporation of Delaware
Filed Dec. 14, 1966, Ser. No. 601,767
Int. Cl. E04g 7/28; A44b 17/00
U.S. Cl. 248—220.5                    10 Claims

ABSTRACT OF THE DISCLOSURE

A one-piece plastic fastener for application to a polygonal aperture in a work panel, including a resiliently collapsible head of polygonal cross-section having a cavity therein to enhance the collapsibility of the corners thereof. A relatively rigid element having a polygonal cross-section similar to that of the aperture in the work panel is axially connected to the head, but has the corners thereof out of alignment therewith, and a second head is connected to the rigid element on the side thereof opposite from the first head.

---

This invention relates generally to fasteners of the type adapted for telescopic association with the aperture of a work panel such as the aperture of a sheet metal panel.

The present invention contemplates a one piece fastener preferably made of plastic material having some degree of inherent flexibility or yieldability and incorporating a head of polygonal cross-section which is recessed sufficiently to render the corners thereof temporarily collapsible when the head is subjected to rotative forces after telescopic association thereof with a work aperture. The resiliency of the material forming said head is such as to cause said corners to spring back to substantially their normal position after the head has been completely inserted through the work aperture.

It is an object of the present invention to not only provide an improved fastener of the type referred to above, but also to provide in association with the fastener, means in the form of a support for shelves and the like.

More specifically, the invention contemplates a fastener incorporating the temporarily collapsible corners of the head as set forth above which is particularly applicable in instances where a fastener can be applied from only one side of an aperture in a work panel, as for example the interior sheet metal wall of a refrigerator or the like.

The foregoing and other objects and advantages will be more apparent from the following detailed description wherein:

FIG. 1 is a perspective view showing an apertured work panel and a fastener of the type contemplated by the present invention;

FIG. 2 is a perspective view similar to FIG. 1, disclosing the fastener secured in a fixed position within a work aperture;

FIG. 3 is an end elevational view of the fastener shown in FIGS. 1 and 2, prior to the association thereof with a work aperture;

FIG. 4 is an enlarged longitudinal sectional view taken substantially along the line 4—4 of FIG. 2;

FIG. 5 is a fragmentary elevational view taken from the left of FIG. 1, showing the head of the fastener in its initial telescopic association with the polygonal aperture of the work panel;

FIG. 6 is a view similar to FIG. 5 showing the partially collapsible corners of the fastener head during the initial application of rotative forces to the enlarged head of the fastener positioned on the opposite side of the work panel;

FIG. 7 is a view similar to FIG. 6, showing the temporarily collapsed corner portions of the fastener head after it has been rotated from the position shown in FIG. 6 to a position where the polygonal section adjacent the under side of the head has almost been brought into registration with the work aperture;

FIG. 8 is a view similar to FIGS. 6 and 7, showing the head and the fastener after it has been completely inserted within the work aperture and has sprung back to substantially its original position wherein the corners of the head and the corners of the section immediately beneath the head are positioned out of alignment with the corners of the head overlying the adjacent surface of the work panel; and FIGS. 9, 10, 11, 12 and 13 are end elevational views similar to FIG. 3 showing various arrangements of recesses in the fastener head and cross-sectional shapes of the fastener head.

Referring now to the drawings more in detail, wherein like numerals have been employed to designate similar parts throughout the various views, it will be seen that one embodiment of the fastener contemplated by the present invention and shown in FIGS. 1–8, inclusive, is designated generally by the numeral 10. The fastener 10 includes a head 12 of polygonal cross-section provided with an internal recess or cavity 14. While in the disclosed embodiment, this cavity 14 is cruciform in shape, other usable shapes and forms of recesses as will be hereinafter observed.

The head 12 is substantially square in cross-section and is adapted to be inserted within a corresponding square aperture 16 in a workpiece 18.

Formed integral with and positioned adjacent the work engaging or clamping side of the head 12 is a section or element 20. The axial thickness of this element 20 may be substantially the same as or slightly larger than the thickness of the sheet panel 18. Also, the section 20 is square in cross-section corresponding to the head 12 with the corners thereof normally positioned out of axial alignment with the corners of the head 12. Formed integral with the side of the square section 20 and oppositely disposed from the clamping side or surface of the head 12 is an enlarged head 22, having diametrically disposed flat edges 24 to facilitate gripping the head 22 with a suitable turning tool or wrench. Where desirable, a portion of the head 22 may be provided with an annular recess 26. Extending axially from and formed integral with the enlarged head 22 is a shank 28 which is incorporated in the fastener in instances where it is to be used as a support, as for example a shelf support on the interior surface of a sheet metal refrigerator wall.

The fastener 10 described above is particularly useful in instances where a fastener is applied from only one side of an apertured panel. Thus it may be assumed for purposes of illustration that the head 12 of the fastener may be telescopically associated with the complementary aperture 16 in the work panel 18 from one side thereof. In applying the fastener to the work panel 18, the head 12 is first inserted within the aperture 16 until the projecting corners of the square section 12 are brought into engagement with the adjacent surface of the panel. Rotation may now be applied to the enlarged head 22 by gripping the surfaces 24 thereof with a suitable turning tool. Forces tending to rotate the head 22 are resisted by the head 12 which is now located within the polygonal aperture 16. At this point it should be noted that the cavity 14 is of sufficient size to render the corners of the head temporarily collapsible as an incident to the forces of rotation acting upon the enlarged head 22. This will cause temporary collapse or distortion of the head 12 as shown in FIGS. 6 and 7. As the square section or element 20 is rotated into registration with the work aperture 16, this section 20 may be moved axially into telescopic association with the aperture 16. Upon complete insertion of the element 20, the head clears the work aperture and the forces tending to collapse the head 12 are released and the corners of the head will spring back substantially to their original position as shown in FIG. 8. In this position the corners of the head overlie the one surface of the panel 18 and the clamping surface of the enlarged head 22 engages the opposite surface of the work panel. The underside of the corners of the head 12 are preferably provided with chamfered or cam surfaces 30, as clearly shown in FIG. 4. Weakening the corner areas in this fashion facilitates the collapse of each corner as rotation is imparted to the fastener head. This also serves to assist entry of section 20 into the panel hole and provides for a snug grip on variable panel thicknesses. In FIGS. 9–12, inclusive, various shapes of recesses in a fastener head of square cross-section are shown. In FIG. 13 a fastener head of substantially triangular cross-section is indicated. In FIGS. 9, 10, 11, 12 and 13 the same numerals as previously employed in FIGS. 1 to 8 inclusive are used to designate similar parts, with the exception that numerals bear the suffix a, b, c, d and e, respectively. It will be apparent from an examination of the disclosures in FIGS. 9–13 that various types of cavities in the head may be employed, providing that these cavities are of sufficient size and so disposed as to render the head and particularly the corners thereof temporarily collapsible when rotation is initially imparted to the enlarged head as previously described.

From the foregoing it will be appreciated that the present invention contemplates fasteners as described above which are of extremely simple and practical construction. Such fasteners may be produced as a single or integral unit by practicing conventional plastic molding methods. It should also be understood that fasteners constructed in accordance with the teachings of the present invention may be employed to secure a plurality of sheets or panels together. In such instances, the fastener may be used with or without the axially projecting support member 28. It has been found practical to employ a fastener head which is hollowed or cavitated so as to present a circumferentially continuous periphery as shown in the drawings. Such cavities or internal recesses must be sufficiently large to assure collapsing of the corner portions of the head as above described, and yet so disposed as not to impair the holding property of the fastener. Also, plastic materials used in the production of the fastener must possess the inherent property or resilience to cause the head to spring back to substantially its initial position in which the corners of the head 12 superimpose the work panel surface on the side oppositely disposed from the work-clamping surface of the second or larger head 22. It has also been found advantageous to so construct the second-mentioned or larger fastener head 22 as to render said head axially yieldable along its outer margin. In the present disclosed embodiment, this is accomplished by providing the annular recess 26. By incorporating this axial resilience or yieldability, the fastener may be associated with a panel or a plurality of panels in which the over-all thickness may vary to a certain degree.

While for purposes of illustration certain structural details have been disclosed herein, it should be understood that the present invention contemplates other changes and modifications coming within the scope of the appended claims.

What is claimed is:

1. A one-piece fastener of plastic material for application to a polygonal aperture in a work panel, such as an apertured sheet metal panel, including a head of polygonal cross-section having an outer work clamping surface, said head having a cavity of sufficient size and shape to render the corners thereof temporarily resiliently collapsible as an incident to rotative forces experienced thereby when said head is telescopically associated with a polygonal panel aperture, a relatively rigid element having a polygonal cross-section corresponding to that of said aperture in said panel, said element being positioned adjacent to and extending axially from the clamping surface of said head for receipt in said polygonal aperture upon the passage of said head through said panel, thereby to traverse said panel and prevent further rotation of said fastener in said aperture, the corners of said element being normally out of alignment with corners of said head, and a second head adjacent said polygonal element and having a work clamping surface axially spaced from the clamping surface of said first-mentioned head sufficiently to accommodate said work panel therebetween.

2. A one piece fastener of plastic material as set forth in claim 1 wherein the first mentioned head of polygonal cross-section is provided with a circumferentially continuous periphery.

3. A one piece fastener of plastic material as set forth in claim 1 wherein the second head adjacent the polygonal element is recessed to impart axial resiliency to said head.

4. A one piece fastener of plastic material as set forth in claim 1 wherein the second fastener head is larger in diameter than the first mentioned fastener head.

5. A one piece fastener of plastic material as set forth in claim 1 having a support member extending axially from the second head.

6. A one piece fastener of plastic material as set forth in claim 1 wherein cam surfaces are provided at the corners of said first head on the clamping side thereof to facilitate entry of the polygonal element into the panel aperture and to provide a snug fit on various panel thicknesses.

7. A one piece fastener of plastic material as set forth in claim 1 wherein the cavity of the first mentioned head has a radial extent which positions said cavity closely adjacent each of the corners of said head.

8. A one piece fastener of plastic material as set forth in claim 1 wherein the cavity in the first head is generally cruciform in cross-sectional shape.

9. A one piece fastener of plastic material as set forth in claim 1 wherein said first head and element associated therewith define a polygonal periphery including at least four sides.

10. A one piece fastener of plastic material as set forth in claim 1 wherein said first head and element associated therewith define a polygonal periphery including less than four sides.

References Cited

UNITED STATES PATENTS

| | | | |
|---|---|---|---|
| 2,709,290 | 5/1955 | Rosenthal | 24—204 |
| 2,940,558 | 6/1960 | Schlueter | 24—221 |
| 3,179,367 | 4/1965 | Rapata | 248—239 |
| 3,220,078 | 11/1965 | Preziosi | 24—221 |
| 3,298,071 | 1/1967 | Flora | 24—221 |

CHANCELLOR E. HARRIS, Primary Examiner.

U.S. Cl. X.R.

24—221; 248—250